US007607993B2

United States Patent
Kametani et al.

(10) Patent No.: US 7,607,993 B2
(45) Date of Patent: Oct. 27, 2009

(54) INK FOR GOLF BALL, TRANSFER PRINTING FILM FOR GOLF BALL AND MARKED GOLF BALL

(75) Inventors: Ryuhei Kametani, Osaka (JP); Takashi Ohira, Chichibu (JP); Susumu Muta, Chichibu (JP)

(73) Assignees: Kametani Sangyo Kabushiki Kaisha, Osaka-Fu (JP); Bridgestone Sports Co., Ltd., Tokyo (JP)

( * ) Notice: Subject to any disclaimer, the term of this patent is extended or adjusted under 35 U.S.C. 154(b) by 409 days.

(21) Appl. No.: 11/224,290

(22) Filed: Sep. 13, 2005

(65) Prior Publication Data

US 2006/0100034 A1    May 11, 2006

(30) Foreign Application Priority Data

Nov. 9, 2004    (JP) .............................. 2004-324656

(51) Int. Cl.
*A63B 37/00* (2006.01)

(52) U.S. Cl. ....................................................... 473/351

(58) Field of Classification Search .................. 473/351
See application file for complete search history.

(56) References Cited

U.S. PATENT DOCUMENTS 5,697,715 A    12/1997  Kuroda et al.
6,217,985 B1 *  4/2001  Hirukawa et al. ......... 428/195.1
6,902,642 B2 *  6/2005  Kawaharada et al. ....... 156/239

FOREIGN PATENT DOCUMENTS

JP            7-89214 A    4/1995
JP          11-139095 A    5/1999

* cited by examiner

*Primary Examiner*—Raeann Trimiew
(74) *Attorney, Agent, or Firm*—Sughrue Mion, PLLC

(57) ABSTRACT

Provided as ink for a golf ball for use in marking a golf ball is ink for a golf ball including an ink resin having a predetermined hydroxyl value and block isocyanate. When marking a golf ball by using the ink of the present invention, a hydroxyl group in the ink resin in an ink layer and an isocyanate group derived from the block isocyanate react with each other to increase hardness of the ink layer, thereby improving abrasion resistance of the marking. In addition, the isocyanate group derived from the block isocyanate and a functional group of an ionomer resin on the ball surface react with each other to improve adhesiveness of marking to the ball surface. Furthermore, the hydroxyl group of the ink resin and an isocyanate group in a urethane top coat layer react with each other to increase strength of the ink layer, thereby improving hitting resistance of the marking. Then, nitrogen in urethane bonding generated by the reaction between the hydroxyl group in the ink layer and the isocyanate group and the isocyanate group in the urethane top coat layer react with each other to further improve abrasion resistance of the marking.

11 Claims, 3 Drawing Sheets

INK FOR GOLF BALL, TRANSFER PRINTING FILM FOR GOLF BALL AND MARKED GOLF BALL

BACKGROUND OF THE INVENTION

1. Field of the Invention

The present invention relates to a technique of marking a golf ball.

2. Description of the Related Art

In general, a surface of a golf ball is marked with letters, numerical characters, graphics and the like in order to make the same be distinguishable from others. Marking is applied by printing with ink for a golf ball mainly composed of a urethane resin, for example, by means of pad printing, stamping of a solid transfer printing film, or thermal transfer using a transfer printing film. Since a golf ball is used under severe conditions, for example, it is hit by a club, abraded by sands in a bunker and collides against a barrier or a tree on the rough, an ink layer which forms marking is required to be excellent in hitting resistance (hardness to break or chip) and abrasion resistance (hardness to be scratched or hurt) in addition to adhesiveness to a ball (hardness to peel off).

Under these circumstances, it is a well known technique to use an ink resin for a golf ball which has a predetermined hydroxyl value as disclosed in Japanese Patent Laying-Open No. 7-89214 (Literature 1) and Japanese Patent Laying-Open No. 11-139095 (Literature 2). With this arrangement, in a case where after marking, the entire ball surface is coated with urethane, a hydroxyl group (—OH) in a marking ink layer and an isocyanate group (—NCO) in a urethane top coat layer react with each other to generate new urethane bonding between these layers to enhance protection of the ink layer.

With such ink as illustrated in Literature 2, however, because a softening temperature of the ink itself is lowered to enable transfer printing at a low temperature, abrasion resistance of the ink as of after the transfer printing is degraded, so that when a pattern printed on a golf ball surface is abraded after the transfer printing, the pattern is liable to be worn away.

SUMMARY OF THE INVENTION

It is accordingly an object of the present invention to provide ink for a golf ball, a transfer printing film for a golf ball and a golf ball marked by the same which enable abrasion resistance and wearing resistance of a transfer-printed pattern to be improved, while maintaining transferability at a low temperature. In the following, the present invention will be detailed including other objects.

The inventors of the present invention accomplished the present invention noticing that because a hydroxyl group which reacts with a top coat layer is a hydroxyl group mostly existing in a surface part of an ink layer, removing a hydroxyl group existing inside of the ink layer by making the same react with other functional group by other means results in eliminating the shortcomings and attributing to improvement in hardness of the ink layer.

The present invention relates to ink for a golf ball for use in marking a golf ball, which includes an ink resin having a predetermined hydroxyl value and block isocyanate.

In the present invention, a dissociation temperature of the block isocyanate ranges from 90 to 120° C.

In the present invention, an ink resin includes a urethane resin and at least either one of a polyester resin and an epoxy resin.

In the present invention, a hydroxyl value of the urethane resin is less than 0.2 or zero, and a hydroxyl value of the polyester resin or the epoxy resin is not less than 60 and not more than 250.

The ink for a golf ball according to the present invention further includes a dissociation catalyst of the block isocyanate.

The ink for a golf ball according to the present invention includes 5 to 10 parts by weight of at least either one of the polyester resin and the epoxy resin, 1 to 15 parts by weight of the block isocyanate and 0.1 to 3 parts by weight of the dissociation catalyst with respect to 100 parts by weight of the urethane resin.

The present invention further relates to a transfer printing film for a golf ball for use in marking a golf ball, in which a predetermined pattern to be transfer-printed onto a golf ball is formed on a base film by the ink for a golf ball according to the present invention.

The present invention further relates to a marked golf ball on which a predetermined pattern is marked by the ink for a golf ball according to the present invention.

As described above, the present invention relates to ink for a golf ball for use in marking a golf ball, a transfer printing film for a golf ball for use in marking a golf ball and a marked golf ball, in which the ink for a golf ball includes an ink resin having a predetermined hydroxyl value and a block isocyanate. As is well known, a block isocyanate is a result of deactivating (stabilizing) at a room temperature an isocyanate group (—NCO) of an isocyanate compound such as hexamethylene diisocyanate (HDI) which has been reacted with a blocking agent such as phenol, and when heated, the blocking agent will dissociate to reproduce a free isocyanate group.

Accordingly, when a predetermined pattern is printed on a golf ball surface with ink including the block isocyanate and then heated, a hydroxyl group of the ink resin and a free isocyanate group from the block isocyanate react in an ink layer to generate a urethane bonding between them and cause a crosslinkage between the ink resins, resulting in improving hardness of the ink layer. As a result, marking having excellent abrasion resistance can be obtained.

In this case, since the free isocyanate group from the block isocyanate makes bonding not only with the hydroxyl group of the ink resin but also with a functional group of an ionomer resin or various kinds of elastomers as a material of a cover layer of the ball surface, adhesion of the marking to the ball is also improved.

It is as a matter of course the same as in conventional art that when the entire ball surface is coated with a urethane top coat after the marking, a hydroxyl group in the marking ink layer and an isocyanate group in the urethane top coat layer react to generate new urethane bonding between these layers, resulting in improving the strength of the ink layer to ensure hitting resistance of the marking.

Thus, the present invention is most characterized in that a residual hydroxyl group inside of the ink layer which fails to react with the urethane top coat layer which is coated later is removed by making the same react with the isocyanate group derived from the block isocyanate, resulting in avoiding softening and degradation in hardness of the ink layer to ensure abrasion resistance, as well as further improving the hardness of the ink layer by crosslinkage formation between the ink resins which follows the above-described reaction.

An isocyanate compound of the block isocyanate which can be used in the present invention is not specifically limited. An isocyanate compound having two or more isocyanate groups in one molecule is preferable because it forms bridge between the ink resins. Among examples of such isocyanate compounds are a diisocyanate compound such as tolylene diisocyanate (TDI), hexamethylene diisocyanate (HDI, HMDI), diphenylmethane diisocyanate (MDI), isophoron diisocyanate (IPDI), xylene diisocyanate (XDI) or hydrogenated xylene diisocyanate (HXDI), a polyisocyanate compound such as polymethylene polyphenylene polyisocyanate or an alicyclic polyisocyanate compound such as isocyanurate type polyisocyanate or burette type polyisocyanate.

A blocking agent of the block isocyanate which can be used in the present invention is not specifically limited as well. Preferably used are, for example, an alcohol compound such as methyl alcohol, ethyl alcohol, iso-propyl alcohol or n-pentyl alcohol, a polyol compound such as ethylene glycol, diethylene glycol or glycerine, a phenol compound such as phenol, p-nitrophenol or m-cresol, an active methylene compound such as acetylacetone, ethyl acetoacetate or ethyl malonate, a lactam compound such as ε-caprolactam, or an amine compound such as ethylenediamine, hexamethylenediamine, xylenediamine or isophoronediamine.

In the present invention, a dissociation temperature preferably ranges from 90 to 120° C. (see claim 2). It is hard to obtain block isocyanate whose dissociation temperature is below 90° C. When the dissociation temperature exceeds 120° C., more energy costs are required and a golf ball might be deformed by heat when the ink layer is cured. Since a dissociation temperature of block isocyanate in general varies with a kind and a combination of an isocyanate compound and a blocking agent, they may be appropriately selected according to a curing temperature of a compounded ink resin, for example.

According to the knowledge of the inventors of the present invention, using an active methylene compound as a blocking agent is preferable because it generally has a relatively low dissociation temperature to enable low temperature curing and printing. Such block isocyanate is, for example, one having a product name Duranate (registered trademark) MF-K60X, which is commercially available from Asahi Kasei Chemicals Cooperation (effective NCO: 6.6% by weight, solid component: 60% by weight, HDI-based isocyanate, dissociation temperature: 90° C.).

According to the present invention, the ink for a golf ball may further include a dissociation catalyst of the block isocyanate (see claim 5). The dissociation catalyst has the effects of accelerating dissociation of the block isocyanate to lower a dissociation temperature, as well as accelerating reaction between a hydroxyl group of the ink resin with an isocyanate group freed from the block isocyanate.

Dissociation catalyst which can be used in the present invention is not specifically limited. While typical are, for example, amines and an organometal compound, according to the knowledge of the inventors of the present invention, an organozinc compound or an organotin compound such as a zinc octylate, a zinc naphthenate or a dibutyltin laurate can be preferably used.

Further according to the present invention, the ink for a golf ball may include various kinds of additives for ink such as ultraviolet absorbent or yellowing inhibitor as required.

According to the present invention, by using such ink for a golf ball as described above, forming a predetermined pattern to be transfer-printed on a golf ball on a base film obtains a transfer printing film for a golf ball for use in marking a golf ball (see claim 7). In this case, since a dissociation temperature of the block isocyanate and a thermal transfer printing temperature of the pattern from the transfer printing film overlap with each other, a hydroxyl group of the ink resin and an isocyanate group freed from the block isocyanate react to cure the ink layer. Using such block isocyanate having a relatively low dissociation temperature or a dissociation catalyst which invites decrease in a dissociation temperature as described above at that time realizes transfer printing at a low temperature to further reduce energy costs, suppress thermal deformation of the golf ball and suppress thermal shrinkage of the base film.

The accompanying drawings help understanding of the present invention, and as shown in FIG. 1, a transfer printing film for a golf ball 10 according to the present invention has ink for a golf ball 12 of the present invention applied on a base film 11, so that the ink 12 forms a predetermined pattern such as letters, numerical characters and graphics to be transfer-printed on the golf ball. "—NCO/B" in the figure indicates that an isocyanate group has its activation hindered by a blocking agent. Thus, because the isocyanate group is inactive at a room temperature to prevent the ink 12 from reacting and curing for a long period of time, the transfer printing film 10 of the present invention has excellent stable storage.

Preferable transfer printing temperature for the transfer printing film of the present invention as a surface temperature of a silicon pad which bonds the transfer printing film onto a golf ball by pressure from the base film side is, for example, from 90 to 150° C., particularly, from 90 to 120° C. Preferable transfer printing time is approximately within 2 seconds. The time may be not less than or not more than 2 seconds according to the degree of dissociation of block isocyanate, in other words, according to reproduction efficiency of a free isocyanate group.

In the present invention, preferably used as an ink resin are a urethane resin and a polyester resin, or a urethane resin and an epoxy resin, or a urethane resin, a polyester resin and an epoxy resin (see claim 3). Since a polyester resin has a lower softening temperature as compared with that of a urethane resin and an epoxy resin is a low fusing point material, containing these materials makes a softening temperature of the entire ink resin be lower as compared with that of an ink resin including only a urethane resin as a main component. As a result, in thermal transfer printing of a pattern from the transfer printing film of the present invention, thermal transfer printing can be realized at a low temperature to enable energy cost to be reduced, and thermal deformation of a golf ball and thermal shrinkage of a base film to be suppressed.

In the present invention, a hydroxyl value of the urethane resin is preferably less than 0.2 or zero and a hydroxyl value of the polyester resin or the epoxy resin is preferably not less than 60 and not more than 250 (see claim 4). When the hydroxyl value of the urethane resin attains 0.2 or more, a softening temperature increases conspicuously due to intermolecular hydrogen bonds to prevent decrease in a softening temperature as a whole of the ink resin in some cases. Even when the hydroxyl value of the urethane resin is set to be 0, because the hydroxyl value of the polyester resin or the epoxy resin is not less than 60, a hydroxyl value will have no shortage as a whole of the ink resin.

On the other hand, when the hydroxyl value of the polyester resin or the epoxy resin becomes less than 60, the hydroxyl value as a whole of the ink resin will be liable to have a shortage, resulting in lowering degree of reaction and degree of bonding with an isocyanate group derived from the block isocyanate in the ink layer and degree of reaction and degree of bonding with an isocyanate group in the urethane top coat layer in some cases. Conversely, when the hydroxyl value of the polyester resin or the epoxy resin exceeds 250, a softening temperature increases conspicuously due to intermolecular hydrogen bonds to prevent decrease in a softening temperature as a whole of an ink resin in some cases. A hydroxyl value of the polyester resin or the epoxy resin preferably ranges from 140 to 210.

Furthermore, in the present invention, preferable as ink is compounding 100 parts by weight of a urethane resin, 5 to 10 parts by weights of a polyester resin, or an epoxy resin or a polyester resin and an epoxy resin, 1 to 15 parts by weight of block isocyanate, and 0.1 to 3 parts by weight of a dissociation catalyst (see claim 6). When parts by weight of the polyester resin or the epoxy resin lowers 5, decrease of a softening temperature is prevented as a whole of the ink resin, while a hydroxyl value as a whole of the ink resin tends to fall short, resulting in lowering the degree of reaction and the degree of bonding with an isocyanate group derived from the block isocyanate in the ink layer and the degree of reaction and the degree of bonding with an isocyanate group in the urethane top coat layer in some cases. Conversely, parts by weight of the polyester resin or the epoxy resin exceeds 10, the entire ink resin is softened excessively to lower the hardness of the ink layer, resulting in degrading abrasion resistance in some cases.

On the other hand, when parts by weight of the block isocyanate lowers 1, isocyanate groups to be reproduced tend to fall short in number to lower the degree of reaction and the degree of bonding with a hydroxyl group of the ink resin in the ink layer and the degree of reaction and the degree of bonding with a functional group of an ionomer resin or the like on the ball surface, so that efficiency of removing a residual hydroxyl group in the ink layer and efficiency of bridging between the ink resins are degraded to result in failing to sufficiently obtain effects of improving hardness of the ink layer in some cases. Conversely, when parts by weight of the block isocyanate exceeds 15, there occurs an excess of the isocyanate groups to cause reaction in an isocyanate compound without reacting with a hydroxyl group or the like in the ink resin, resulting in reducing bridging efficiency, as well as degrading pattern transferability in some cases. The reason why the dissociation catalyst is set to be 0.1 to 3 parts by weight is substantially the same.

Ink may be compounded with nitrocellulose. When nitrocellulose is compounded, a surface coated with the ink will dry fast to improve marking workability, thereby reducing working time.

Base film which can be used as a transfer printing film of the present invention is not specifically limited. Preferably usable, for example, are a polypropylene film, a biaxial oriented polypropylene film, and laminate of these films and glassine paper.

As a method of forming a pattern on a base film by using the ink of the present invention, conventionally well known gravure, silkscreen printing and the like can be adopted without any problem.

Then, the present invention obtains a golf ball with a predetermined pattern marked by using such a transfer printing film for a golf ball as described above or such ink for a golf ball as described above (see claim 8). More specifically, as shown in FIG. 2, a golf ball 20 of the present invention is a two-peace ball with, for example, a core 21 and a cover layer 22 covering the same formed integrally, in which marking 23 is applied on the cover layer 22 on which marking a urethane top coat layer 24 is formed over the ball 20. In other words, the marking 23 is sandwiched between the cover layer 22 and the urethane top coat layer 24.

Although representative of other methods of marking a golf ball by using thus described ink for a golf ball than the thermal transfer printing using a transfer printing film is pad printing, a further method, for example, silkscreen printing, can be employed.

In any of the methods, since the marking 23 is applied by such ink for a golf ball 12 as described above, reaction (reference symbol A) in the ink layer 12 between a hydroxyl group of the ink resin and an isocyanate group derived from the block isocyanate reduces residual hydroxyl groups to cause bridge formation between the ink resins, thereby improving hardness of the ink layer 12 to make the marking 23 have excellent abrasion resistance. In addition, the reaction (reference symbol B) between an isocyanate group derived from the block isocyanate and a functional group of as an ionomer resin or the like on the surface of the ball 20 makes the marking 23 have improved adhesion to the surface of the ball 20. Furthermore, the reaction (reference symbol C) between a hydroxyl group of the ink resin and an isocyanate group in the urethane top coat layer 24 makes the ink layer 12 have improved strength and the marking 23 have superior hitting resistance. In addition, a (—NH—) portion in urethane bonding (—O—CO—NH—) generated by the reaction between the hydroxyl group and the isocyanate group and the isocyanate group in the urethane top coat layer 24 react to generate new chemical bonding (reference symbol D) to make the marking 23 have further improved abrasion resistance. Then, by using such block isocyanate whose dissociation temperature is relatively low and a dissociation catalyst which causes decrease of a dissociation temperature as described above or the like, transfer printing at a low temperature can be realized to barely have thermal deformation of a dimple configuration on the surface of the golf ball 20.

The golf ball according to the present invention may be a one-piece ball, a two-piece ball, a three-piece ball or other multilayer solid golf ball, or a bobbin winder golf ball.

As a material of a cover layer on the surface of the golf ball on which marking is applied, polyurethane, polyester or polyamide or a mixture of these materials can be used other than the above-described ionomer resin (a resin having special structure in which molecules of an ethylene-methacrylic acid copolymer or an ethylene-acrylic acid copolymer are bonded by metal ions such as sodium or zinc).

Furthermore, as surface treatment of the golf ball surface before marking, chemical treatment using chlorine-based chemicals or the like can be employed other than well-known plasma processing (processing of making gas into plasma by using high-frequency waves and subjecting a resin product to the atmosphere to improve its surface quality, thereby improving painting, coating, adhesion, leakage, etc.)

The foregoing and other objects, features, aspects and advantages of the present invention will become more apparent from the following detailed description of the present invention when taken in conjunction with the accompanying drawings.

DESCRIPTION OF THE EMBODIMENTS

[Preparation of Transfer Printing Film]

Figure 1:
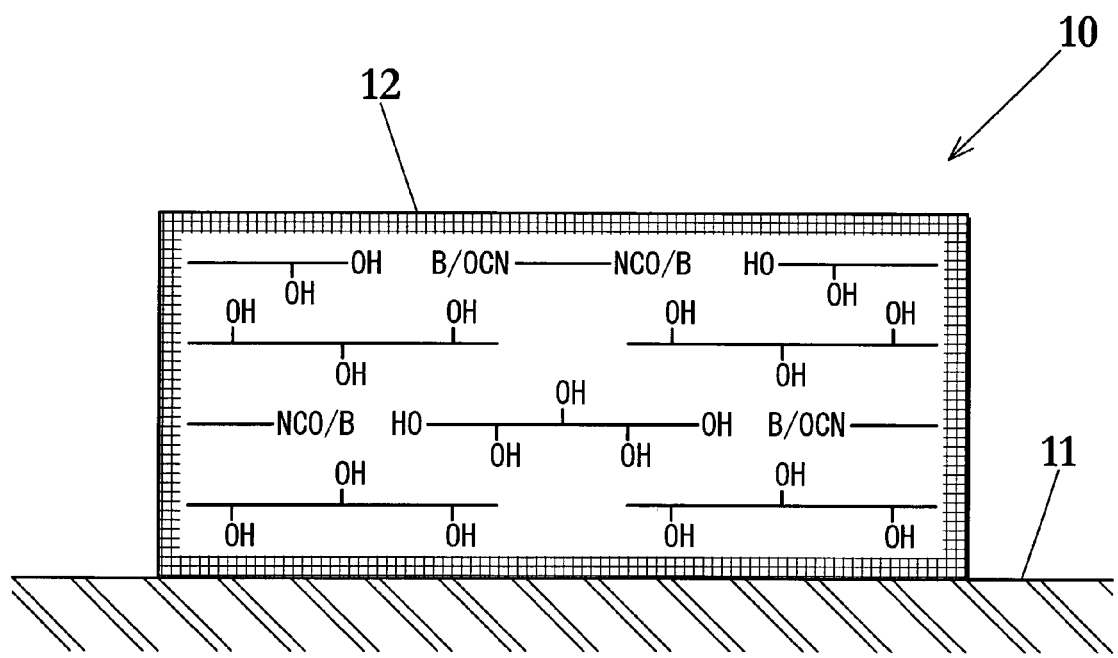
FIG. 1 is an expanded sectional view schematically showing a layered structure of a transfer printing film for a golf ball according to the present invention.
Figure 2:
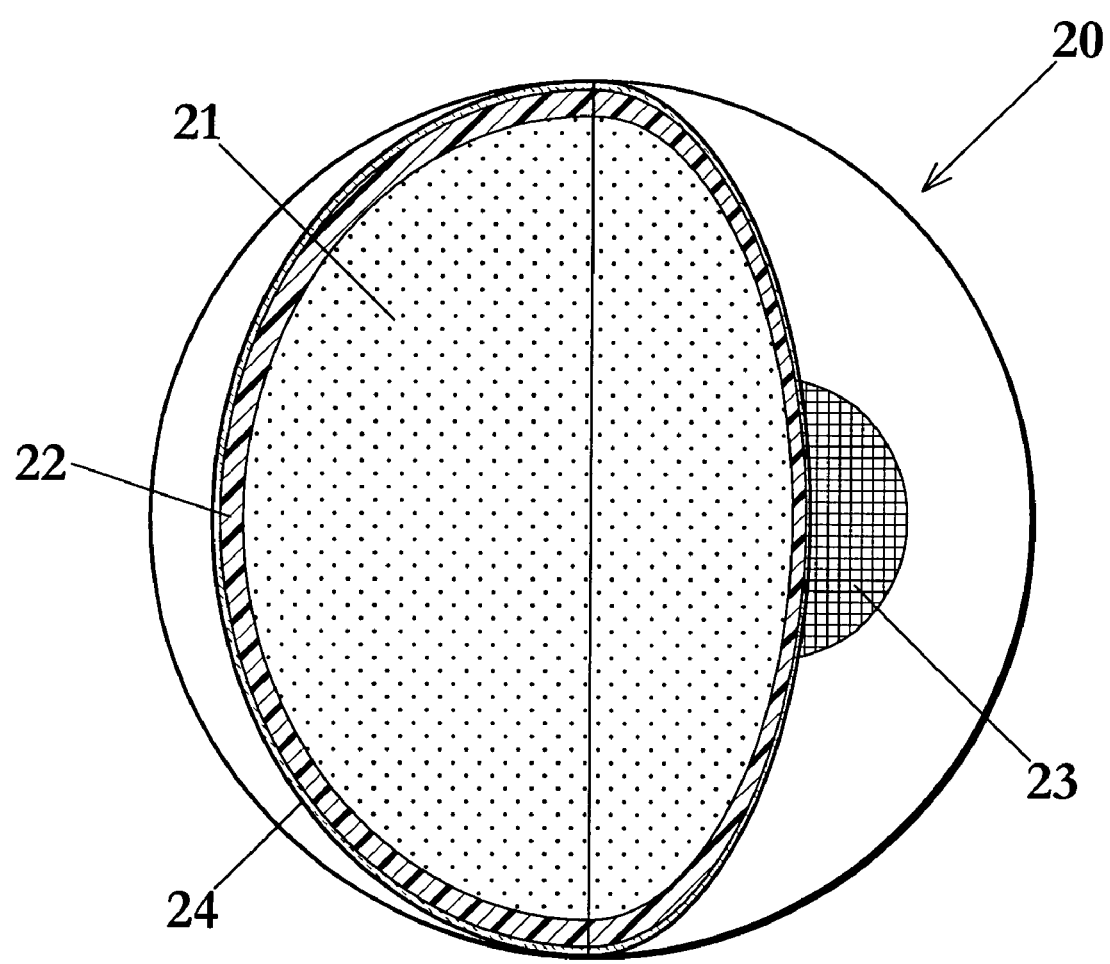
FIG. 2 is a side view of a partly cut away golf ball marked according to the present invention.
Figure 3:
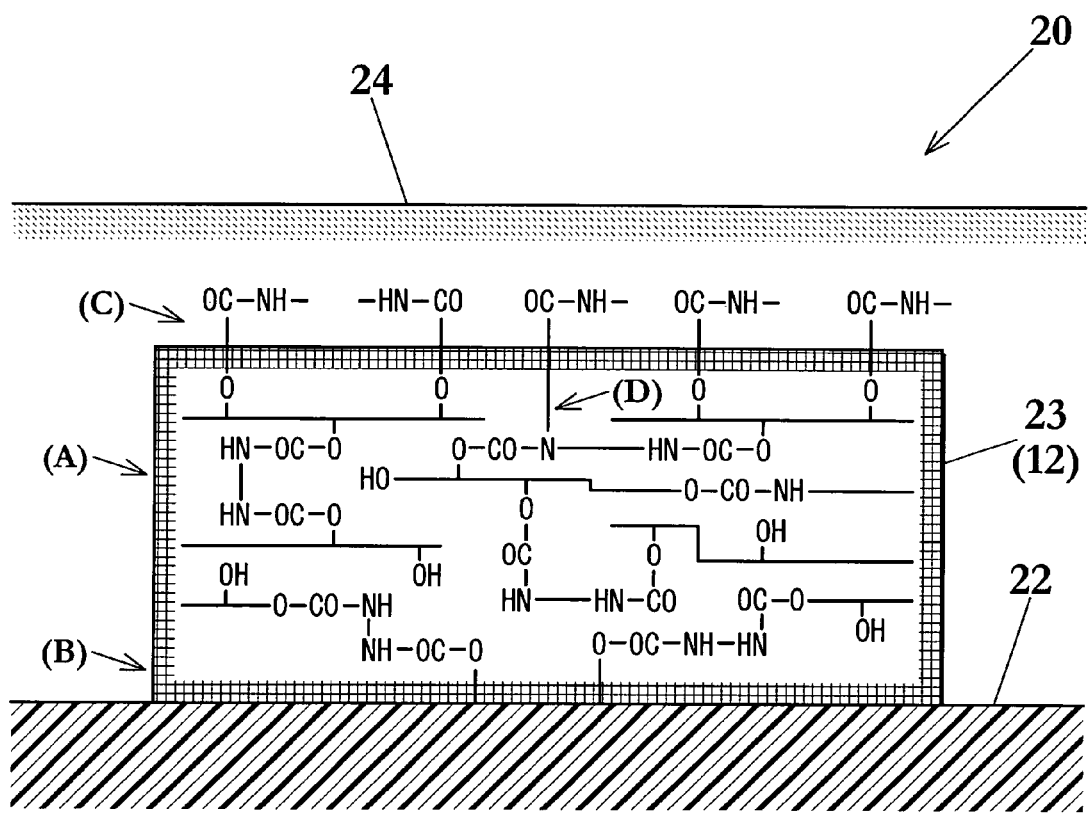
FIG. 3 is an expanded sectional view schematically showing a layered structure of a marked part of the golf ball.

First, according to a compounding ratio shown in Table 1, a urethane resin whose hydroxyl value is 0.1, a polyester resin whose hydroxyl value is 150, Duranate (registered trademark) MF-K60X manufactured by Asahi Kasei Chemicals Cooperation (solid component: 60% by weight, HDI-based isocyanate) as block isocyanate, zinc octylate as a dissociation catalyst and carbon black as a color pigment are mixed with an organic solvent to prepare ink for a golf ball according to the present invention. Then, with a biaxial oriented polypropylene film whose thickness is 20 μm as a base film, a circle whose diameter is about 1 mm and whose inside is painted out is printed as a pattern having a thickness of 5 μm by silkscreen printing on the film by using the above-described ink to prepare transfer printing films for a golf ball 1 to 6 according to the present invention. In the transfer printing film 6, nitrocellulose is further added. In the table, the amount of compound of block isocyanate is the amount of compound as a solid component.

As a transfer printing film as a comparative example, ink having no block isocyanate (no dissociation catalyst accordingly) compounded is prepared as shown in Table 2.

TABLE 1

| Ink composition/ Transfer printing film | Embodiment | | | | | |
|---|---|---|---|---|---|---|
| | 1 | 2 | 3 | 4 | 5 | 6 |
| Urethane resin | 100 | 100 | 100 | 100 | 100 | 100 |
| Polyester resin | 8.0 | 8.0 | 8.0 | 8.0 | 8.0 | 8.0 |
| Block isocyanate | 8.0 | 5.0 | 10.0 | 8.0 | 8.0 | 8.0 |
| Nitrocellulose | — | — | — | — | — | 8.0 |
| Dissociation catalyst | 1.3 | 1.3 | 1.3 | 0.1 | 3.0 | 1.3 |
| Color pigment | 100 | 100 | 100 | 100 | 100 | 100 |
| Organic solvent | 180 | 180 | 180 | 180 | 180 | 180 |

(unit: parts by weight)

TABLE 2

| Ink composition/ Transfer printing film | Comparative Example |
|---|---|
| Urethane resin | 100 |
| Polyester resin | 8.0 |
| Block isocyanate | — |
| Nitrocellulose | — |
| Dissociation catalyst | — |
| Color pigment | 100 |
| Organic solvent | 180 |

(unit: parts by weight)

[Thermal Transfer Printing of Pattern]

Using these transfer printing films (the embodiments 1 to 6 and the comparative example), a golf ball is marked. More specifically, prepare a plurality of two-piece balls which are obtained by covering a core made of crosslinked rubber whose main component is polybutadiene rubber with a cover layer which has a thickness of 2 mm and whose main component is an ionomer resin having Shore D hardness of 65 and by subjecting the surface of the obtained ball to plasma processing. Then, position a pattern of the above-described transfer printing film on the surface of the golf ball and with a silicon rubber pad bonded by pressure from the side of a base film under the transfer printing conditions of a transfer printing temperature of 100° C. (as a surface temperature of the silicone rubber pad) and a transfer printing time of one second, thermally transfer-print the above-described pattern. Thereafter, on the transfer-printed pattern, that is, on the marking, apply two-component reactive type urethane top coating by spray coating all over the golf ball and dry and cure the obtained ball at 55° C. for 50 minutes. Then, the following various kinds of tests are executed with respect to thus obtained golf ball.

[Transferability Test]

With respect to 20 golf balls, observation and determination is visually made whether the pattern is completely transferred or not. The results are shown in Table 3 and Table 4. In the tables, "○" stands for excellent transfer, "Δ" stands for a part of the pattern being defectively transferred and "X" stands for a large part of the pattern being defectively transferred.

[Adhesion Test]

As a test of adhesion of marking, peel test is conducted by using an adhesive tape (clear tape manufactured by Sumitomo 3M Limited). The results are shown in Table 3 and Table 4. In the tables, "○" stands for no peel off, "Δ" stands for a part of the pattern being peeled off and "X" stands for a large part of the pattern being peeled off.

[Abrasion Resistance Test]

With one golf ball immediately after pattern transfer and prior to application of urethane top coat and another immediately after drying and prior to the same held by each one hand, visually observe and determine the degree of blurs and scratches of the pattern after rubbing the patterns together by hands for 30 to 60 seconds. The results are shown in Table 3 and Table 4. In the tables, "○" stands for no blur and no loss, "Δ" stands for some blurs and losses and "X" stands for a large numbers of blurs and losses.

[Hitting Resistance Test]

After hitting the golf ball toward a cloth target at a head speed of 45 m/s by using a #1 wood 200 times, visually observe and determine the degree of damages of the marking. The results are shown in Table 3 and Table 4. In the tables, "○" stands for no breakage and no chipping, "Δ" stands for a part of the pattern being broken and chipped and "X" stands for a large part of the pattern being broken and chipped.

[Sand Abrasion Test]

Rotate a ball for two hours which is put in a ceramic bowl mill filled with sands of bunker that are actually used in a golf course. Thereafter, take out the ball and visually observe and determine the degree of damages of the marking. The results are shown in Table 3 and Table 4. In the tables, "○" stands for no blur and no loss, "Δ" stands for a part of the pattern having some blurs and losses and "X" stands for a large part of the pattern having blurs and losses.

[Sand/Water Abrasion Test]

Similarly rotate a ball put in a ceramic bowl mill filled with the same amount of sands of bunker which are actually used in a golf course and water for three hours. Thereafter, take out the ball and visually observe and determine the degree of damages of the marking. The results are shown in Table 3 and Table 4. In the tables, "○" stands for no blur and no loss, "Δ" stands for a part of the pattern having some blurs and losses and "X" stands for a large part of the pattern having blurs and losses.

TABLE 3

| Name of Test | embodiment | | | | | |
|---|---|---|---|---|---|---|
| | 1 | 2 | 3 | 4 | 5 | 6 |
| Transferability | ○ | ○ | ○ | ○ | ○ | ○ |
| Adhesion | ○ | ○ | ○ | ○ | ○ | ○ |
| Abrasion Resistence (immediately after transfer) | ○ | ○ | ○ | ○ | ○ | ○ |
| Abrasion Resistence (immediately after drying) | ○ | ○ | ○ | ○ | ○ | ○ |
| Hitting Resistence | ○ | ○ | ○ | ○ | ○ | ○ |
| Sand Abrasion | ○ | ○ | ○ | ○ | ○ | ○ |
| Sand/Water Abrasion | ○ | ○ | ○ | ○ | ○ | ○ |

TABLE 4

| Name of Test | Comparative Example |
| --- | --- |
| Transferability | ○ |
| Adhesion | Δ |
| Abrasion Resistence (immediately after transfer) | X |
| Abrasion Resistence (immediately after drying) | X |
| Hitting Resistence | Δ |
| Sand Abrasion | Δ |
| Sand/Water Abrasion | ○ |

As is clear from Table 3, the embodiments 1 to 6 show excellent results in all the test items including adhesion of a ball to marking (hardness to peel off), abrasion resistance (hardness to blur and scratch) and hitting resistance (hardness to break and chip). On the other hand, as is clear from Table 4, the comparative example which uses neither block isocyanate nor a dissociation catalyst is extremely inferior in adhesion, abrasion resistance, hitting resistance and sand abrasion resistance.

Furthermore, as other embodiments, marking these golf balls with kinds of resins, block isocyanates and dissociation catalysts, the amount of compound of the same, a transfer printing temperature, a transfer printing time period and a hydroxyl value changed within the range of the present invention and executing the various tests with respect to these golf balls under the above-described conditions all obtain excellent results similarly to the embodiments 1 to 6.

As detailed with respect to the specific examples in the foregoing, the present invention enables provision of marking superior in adhesion, hitting resistance and abrasion resistance by making ink for marking a golf ball include an ink resin having a hydroxyl group and block isocyanate together. The present invention has a wide range of industrial use in the technical field of golf ball marking.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. Ink for a golf ball for use in marking a golf ball, including an ink resin having a predetermined hydroxyl value and a block isocyanate, wherein the ink resin includes a urethane resin, and a polyester resin and/or an epoxy resin, and a dissociation temperature of the block isocyanate ranges from 90 to 120° C.

2. The ink for a golf ball according to claim 1, wherein a hydroxyl value of the urethane resin is less than 0.2 or zero and a hydroxyl value of the polyester resin or the epoxy resin is not less than 60 and not more than 250.

3. The ink for a golf ball according to claim 1, including a dissociation catalyst of the block isocyanate.

4. The ink for a golf ball for use in marking a golf ball according to claim 3, including with respect to 100 parts by weight of the urethane resin, 5 to 10 parts by weight of at least either one of the polyester resin and the epoxy resin, 1 to 15 parts by weight of the block isocyanate and 0.1 to 3 parts by weight of the dissociation catalyst.

5. A transfer printing film for a golf ball for use in marking a golf ball, wherein a predetermined pattern to be transferred onto a golf ball is formed on a base film by the ink for a golf ball according to claim 1.

6. A marked golf ball having a predetermined pattern marked by the ink for a golf ball according to claim 1.

7. Ink for a golf ball for use in marking a golf ball, including an ink resin having a predetermined hydroxyl value and a block isocyanate, wherein a dissociation temperature of the block isocyanate ranges from 90 to 120° C. and isocyanate groups freed from the block isocyanate bond not only with hydroxyl groups of the ink resin but also with functional groups existing on the ball surface.

8. The ink for a golf ball according to claim 7, wherein the ink resin includes a urethane resin, and a polyester resin and/or an epoxy resin.

9. The ink for a golf ball according to claim 8, wherein a hydroxyl value of the urethane resin is less than 0.2 or zero and a hydroxyl value of the polyester resin or the epoxy resin is not less than 60 and not more than 250.

10. The ink for a golf ball according to claim 8, including a dissociation catalyst of the block isocyanate.

11. The ink for a golf ball for use in marking a golf ball according to claim 10, including with respect to 100 parts by weight of the urethane resin, 5 to 10 parts by weight of at least either one of the polyester resin and the epoxy resin, 1 to 15 parts by weight of the block isocyanate and 0.1 to 3 parts by weight of the dissociation catalyst.

* * * * *

UNITED STATES PATENT AND TRADEMARK OFFICE
CERTIFICATE OF CORRECTION

PATENT NO. : 7,607,993 B2 Page 1 of 1
APPLICATION NO. : 11/224290
DATED : October 27, 2009
INVENTOR(S) : Kametani et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 557 days.

Signed and Sealed this

Twelfth Day of October, 2010

David J. Kappos
*Director of the United States Patent and Trademark Office*